Patented May 10, 1927.

1,628,326

UNITED STATES PATENT OFFICE.

WILLIAM G. O'BRIEN, OF AKRON, OHIO, ASSIGNOR TO THE GOODYEAR TIRE & RUBBER COMPANY, OF AKRON, OHIO, A CORPORATION OF OHIO.

METHOD OF TREATING RUBBER.

No Drawing.   Application filed March 22, 1923.   Serial No. 626,895.

My invention relates to a method of treating rubber and pertains more particularly to a method of vulcanization therefor.

The object of my invention consists in providing a novel method of introducing a curing agent and controlling the resulting cure whereby a simplified process of manufacture may be employed to produce a high quality product.

In the manufacture or rubber products, especially those in which rubber is spread or otherwise deposited upon fabric, fibers or the like, it is very desirable that the vulcanizing agent be introduced into the rubber while in the form of a cement. It is also very desirable that some method of controlling the rate of the cure of the rubber be provided so that the rubber will not be cured prior to its deposition upon the fabric or fibers. This is necessary, owing to the fact that when rubber is cured it loses its adhesive properties, and must therefore be placed in the desired form or relation with respect to other materials, of which it is intended to constitute an integral portion, prior to the completion of the cure thereof. By my invention, I have provided a method of controlling the cure of the rubber under the conditions set forth.

In practicing my invention a quantity of rubber is dissolved or absorbed in a quantity of rubber solvent, such for example as toluol, gasoline, benzene or the like, until a mixture of preferably about 10% rubber is produced. This cement is then treated with a quantity of sulphur-dioxide, and subsequently treated with a quantity of hydrogen sulphide. The gases are admitted in approximately the proportions of 30 to 50 c. c. of sulphur dioxide and 75 to 125 c. c. of hydrogen sulphide for each gram of rubber present.

This mixture is permitted to stand for a short interval of time, possibly 20 or 30 minutes, during which the interaction of the sulphur dioxide and hydrogen sulphide tends to cause jellation of the rubber, which is the first indication of the cure thereof. This interaction is permitted to continue, until the point of jellation is almost reached, at which time the cement is diluted by adding an additional quantity of rubber solvent, preferably similar in nature to the solvent originally employed. The dilution of the mixture delays the jelling of the rubber, the rate of jellation being materially reduced thereby. The rate of jellation varies substantially directly with the concentration of rubber in the mixture.

With the rate of jellation reduced to the desired extent, the rubber cement may then be spread upon the fabric and the toluol removed therefrom, the cure being accomplished without further attention thereto by the interaction of the hydrogen sulphide and sulphur dioxide. The dilution of the cement delays the completion of the cure until sufficient time has elapsed to permit of disposing the cement or the rubber in the cement in the desired final relationship with the fabric. If it is desired to manufacture a rubberized fibrous product, the rubber may be precipitated from the cement after being mixed with the fibers, and the fibers provided with individual coatings of rubber strained from the mixture and permitted to cure.

The control of the rate of jelling or the rate of cure may be effected in various other ways. Temperature control may be employed, as the rate of jellation increases with a rise in temperature. If an excess of both hydrogen sulphide and sulphur dioxide are employed, the rate of jellation is increased. Employing a moderate amount of hydrogen sulphide and an excess of sulphur dioxide greatly increases the rate. A moderate amount of sulphur dioxide and an excess of hydrogen sulphide also produces a marked increase in the rate of jellation. A moderate amount of hydrogen sulphide and a quantity of sulphur dioxide slightly in excess of the proportions set forth, with a quantity of carbon dioxide subsequently added thereto materially increases the rate of the cure. The presence of alcohol in this cement, if not sufficient in quantity to cause precipitation of the rubber, retards the jellation. Precipitation of the rubber from a dilute cement increases the rate, and dilution of a treated cement retards it as already described. The presence of fibers or various pigments may delay or hinder jellation or may require larger amounts of the curing gases to produce the desired results.

From the foregoing description, it will be apparent that the rate of jellation and the resulting vulcanization, may be controlled in various ways, but the preferred method is the dilution of the cement, especially in the preparation of rubberized fibrous products, as the precipitation of rubber from a dilute cement upon fibers mixed therewith produces a much more uniform and better product than does similar precipitation from a thick cement.

Although I have described a number of forms which my invention may assume, it will be apparent to those skilled in the art that its possibilities are by no means exhausted and that many additional applications thereof may be made without departing from the spirit of my invention or the scope of the appended claim.

What I claim is:

The method of making a rubberized fibrous composition which comprises treating a quantity of rubber cement with hydrogen sulphide and sulphur dioxide and permitting interaction thereof for a short period of time, diluting the mixture with a quantity of rubber solvent prior to the jellation thereof, mixing a quantity of thoroughly separated fibers with the mixture precipitating the rubber upon the fibers, straining the fibers from the liquid, and permitting them to jell.

In witness whereof, I have hereunto signed my name.

WILLIAM G. O'BRIEN.